US006964548B2

(12) United States Patent  (10) Patent No.: US 6,964,548 B2
Andre                          (45) Date of Patent:    Nov. 15, 2005

(54) FLANK PART AS BODY COMPONENT FOR AN AUTOMOBILE TRANSPORTER, WHETHER MOTOR-DRIVEN OR NOT

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 10/479,187

(22) PCT Filed: May 28, 2002

(86) PCT No.: PCT/FR02/01784

§ 371 (c)(1),
(2), (4) Date: Nov. 26, 2003

(87) PCT Pub. No.: WO02/096705

PCT Pub. Date: Dec. 5, 2002

(65) Prior Publication Data

US 2004/0136800 A1   Jul. 15, 2004

(30) Foreign Application Priority Data

May 30, 2001 (FR) .................................. 01 07100
May 28, 2002 (FR) .................................. 02 01784

(51) Int. Cl.$^7$ .................................................. B60P 3/08
(52) U.S. Cl. .............................. 410/29; 410/7; 410/26
(58) Field of Search ............................ 410/24, 3, 4, 7, 410/8, 13, 14, 15, 16, 17, 18, 26, 27, 29, 410/29.1

(56) References Cited

U.S. PATENT DOCUMENTS

| 3,690,717 A |   | 9/1972  | Taylor |
| 4,701,086 A |   | 10/1987 | Thorndyke |
| 5,067,862 A | * | 11/1991 | Andre ........................ 410/26 |
| 5,071,298 A | * | 12/1991 | Conzett ...................... 410/27 |
| 5,527,138 A | * | 6/1996  | Flores et al. ............... 410/29.1 |
| 6,491,484 B2 | * | 12/2002 | Kubota ...................... 410/29.1 |

FOREIGN PATENT DOCUMENTS

DE   30 42 739 A   9/1982
EP   0 718 149 B   5/1999

* cited by examiner

*Primary Examiner*—H. Gutman
(74) *Attorney, Agent, or Firm*—Davis & Bujold, P.L.L.C.

(57) ABSTRACT

A flank part (1) for an automobile transporter consisting of a finished structural single-piece part, ready to be mounted by being assembled to a frame base or another component to form a complete automobile transporter body linked to other elements in a limited number of locations. The side part (1) incorporates all the elevating posts (2) and (3) each with its elevating device (20) moving along a guiding profiled section (17). The upright or sloping elements of the framework of the flank part form a visual cover viewed from the front for each of the lifting assembly (20) and the actuating mechanism thereof (21). The invention is of interest to all manufacturers of automobile transporters.

14 Claims, 3 Drawing Sheets

FLANK PART AS BODY COMPONENT FOR AN AUTOMOBILE TRANSPORTER, WHETHER MOTOR-DRIVEN OR NOT

This application is a national state completion of PCT/FR02/01784 filed May 28, 2002 which claims priority from French Application Ser. No. 01/07100 filed May 30, 2001.

FIELD OF THE INVENTION

The present invention relates to a flank part forming a portion of a truck or tractor-trailer body designed for transporting new, used, or damaged cars on the highway.

BACKGROUND OF THE INVENTION

The bodies of vehicles designed to transport cars or other vehicles are constructed using mechanical soldering techniques to join tubular elements.

This type of structure forming the body of automobile-transporting vehicles consists of profiled tubular elements soldered together to form a frame. The upright elements are appropriately shielded by oblique posts reinforced by the addition of transverse elements to provide the necessary mechanical rigidity and support.

The devices which support and elevate the supporting platforms are displaceable along the upright elements and vertical or oblique posts located on a straight line with or near the articulating connections to the adjacent supporting platforms.

These supporting elements generally consist of peripheral slides outside tubes with the same shaped section which are displaced along these tubular elements by means of motor elements such as a screw/translation nut device or cylinders. They are usually immobilized in a given position by means of pins. For this reason, the posts and upright elements have openings on their two opposing surfaces, that is, the right and left surfaces, to engage the blocking pins.

One example of a design of this type is found in U.S. Pat. No. 3,690,717 in the name of TAYLOR.

The construction technique used in the automobile transporter described in this patent uses tubular elements with a square section mechanically soldered to longitudinal members forming a generally frame-like flank structure connected to a base-chassis.

There are slides attached to the elevating posts which are activated to move in translation along these posts by means of cylinders articulated at the base to the lower longitudinal element on the flank structure. Each slide has an articulating element joining it to a vehicle supporting platform.

This design is not practical in use. The carriage is highly susceptible to corrosion, since the elevating devices are not protected from the elements or from bumps, giving it an unsightly appearance due to rust and the openings in the posts and their components, with the various pieces, connections, wires, supply and control cables being visible and poorly arranged.

Moreover, this type of tubular flank body remains rigid under torsion, causing the chassis to be too rigid and subject to the fissures which appear due to the weight of the load and the dynamics of displacement when the base vehicle to which the structure is attached moves and stops.

The number of connection points between the tubular flanks and the chassis is multiplied in order to divide constraint concentrations in parallel.

Furthermore, corrosion resistance is reduced due to the multiple hollow elements forming partially closed areas in the mechanically soldered tubular flank structure where damp air is easily trapped and condensed.

This tendency to corrosion is increased because it is difficult to treat the interior and exterior surfaces of the profiled tubular guide elements, as well as the interior surfaces of the slides.

Moreover, the installation procedure is doomed to remain a manual procedure, since it is difficult to automate or mass produce. A simple example of the assembly difficulties encountered concerns the slide which is displaced along the tube by the motor elements for raising or lowering the platforms. It is necessary to actually thread the slide onto the tubular element which then guides it while the slide is still free, that is, before the guide is soldered to the nearby profiled tubular elements to form a frame.

Of equal importance are the difficulties in upkeep, repair, and maintenance, since replacing or removing a slide necessitates disconnecting the tube that supports it.

Finally, these devices characteristically constitute a multitude of cross-pieces, which not only lengthens construction time, but also increases the weight and cost of the unit.

Generally speaking, with this manufacturing technique the order imposed by the successive attachment operations must be respected. It cannot be modified at all for purposes of saving construction time or for reasons associated with location or work efficiency. Under these conditions, no real improvements are possible without abandoning the manufacturing technique.

In addition, the manufacturing cycle should be adaptable to the particular chassis to be equipped, as each chassis imposes different constraints respecting size and accessibility.

SUMMARY OF THE INVENTION

The goal of the present invention is to overcome these disadvantages by a complete change of manufacturing technique, proposing a flank piece that is entirely formed, finished, and produced in series, occurring in parallel with the manufacture of the supporting carriage as an actual sub-assembly to be joined to the other components using simple, rapid methods that do not require highly skilled manual work.

The present invention relates to a flank element for the body of an automobile transporting vehicle that is completely formed, i.e., functionally complete and finished, incorporating the means for raising the platforms supporting the vehicles.

It consists of a plurality of composite profiled elements forming posts and has a flat treated exterior surface painted in the client's custom colors and a technical interior surface forming a guide for the corresponding elevating means which is displaced along the post and connected to the adjacent supporting platform with a pivot articulation allowing it to be displaced and angled.

The intermediate space between the two surfaces forms a protected area for housing the motor elements activating the elevating means.

Numerous advantages are derived from the present invention:
  because the unit is completely built as a sub-assembly, production can proceed in a rational order;
  the flank piece is compatible with platforms in general use, therefore it is guaranteed to suit users' work requirements and specialized needs;

- the loading and unloading principles remain unchanged and the posts remain in the same place. Motion is conserved. The operator works in the same way using the same skills.
- the profiled pieces have no closed sections. On the contrary, two flat pieces form the exterior surface and the interior surface, joined by a web.

This design prevents condensation from forming in the hollow spaces and so corrosion resistance is improved at the outset.

The design also provides for a hollow interior space, not visible from the front, to house the motor means controlling the elevating device.

This solution also provides protection to the motor and the elevating means from bumps, falling objects, and other exterior assaults.

Finally, the design allows the visible surfaces to be easily treated with neutral rust proofing while only the exterior surface of the piece is painted in the client's colors. The interior surface may be definitively prepared using the same treatment and final layer on all the flank pieces.

- each flank piece is flexible under torsion and does not make the chassis excessively rigid;
- manual labor costs are markedly reduced since soldering prevents prior painting;
- the product is attractive and visually pleasing, since all the elevating devices are hidden by the exterior post surfaces and all the hydraulic connections run along the interior surfaces, remaining invisible from the exterior;
- repair and maintenance are facilitated because the elevating devices are easy to access and there is no need to dismantle the flanks pieces in order to remove or replace moving parts;
- the production flexibility sought for products of this type is finally achieved.

BRIEF DESCRIPTION OF THE DRAWINGS

Other characteristics and features of the invention will be apparent from the following description provided by way of example and accompanied by the drawings, wherein.

DETAILED DESCRIPTION OF THE INVENTION

Figure 1:
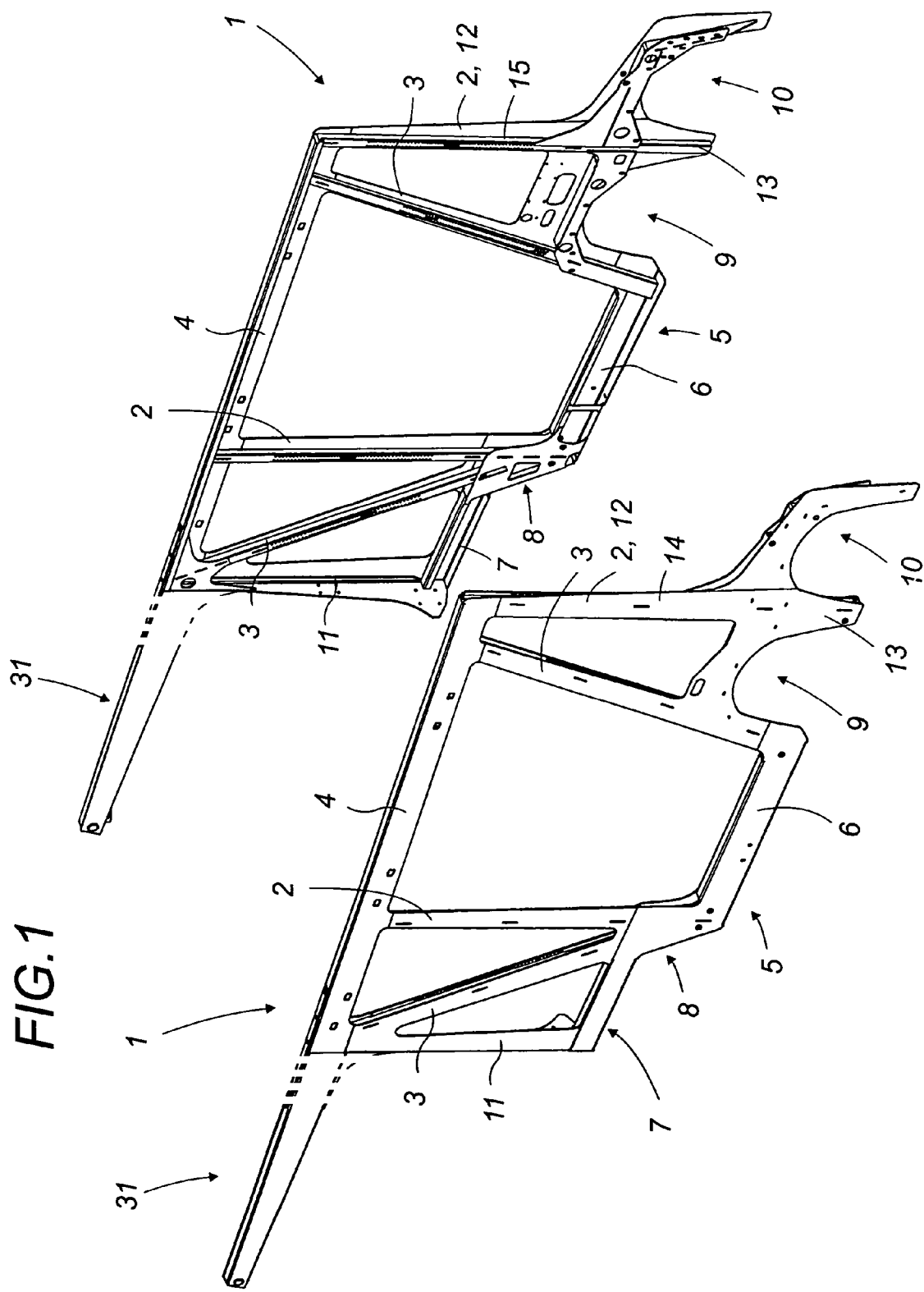
FIG. 1 is a perspective showing two flank pieces in the upright operating position and not equipped with the slides of the support and elevating system.
Figure 2:
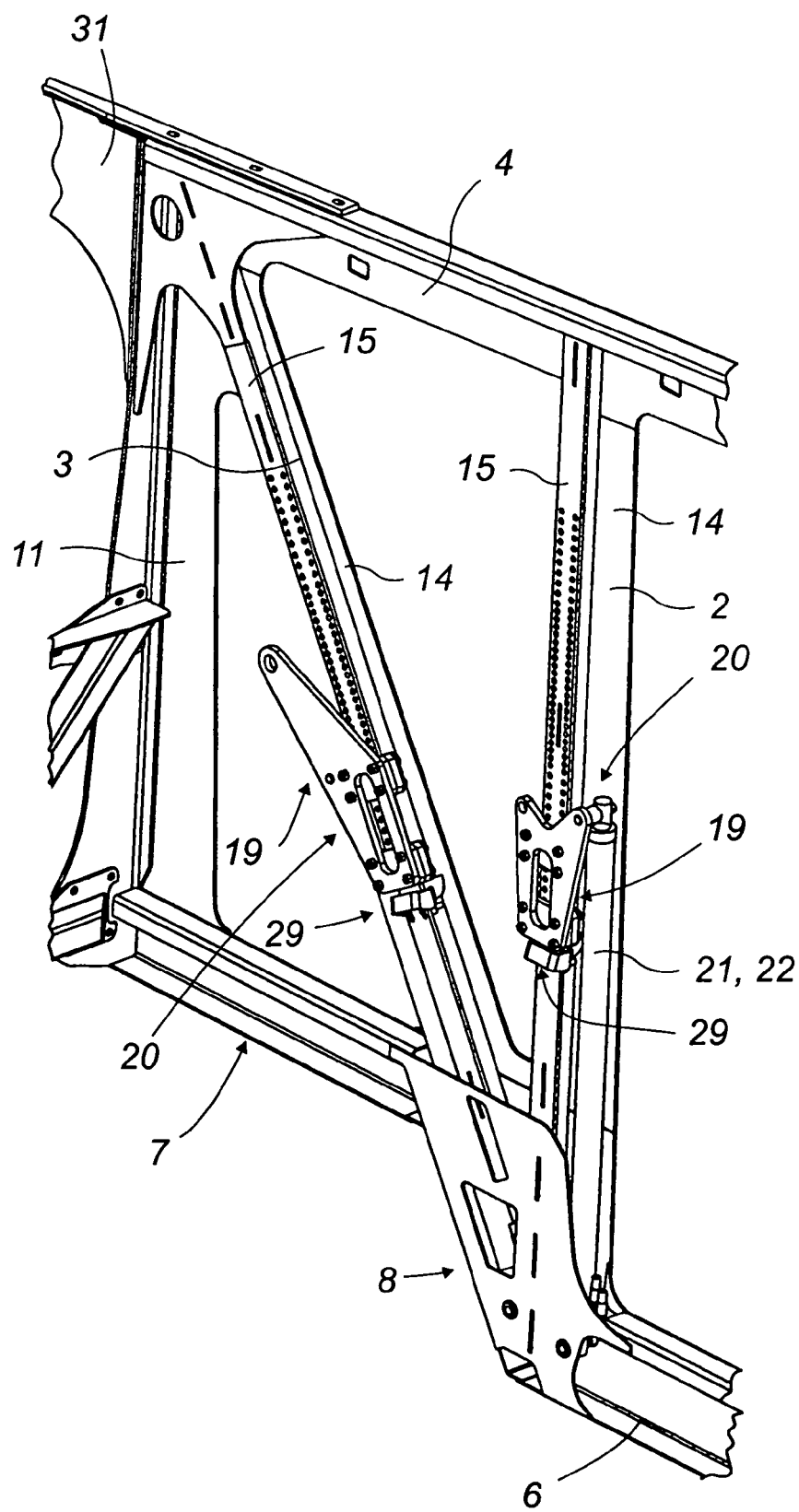
FIG. 2 is a partial perspective showing the central portion and the front portion of one of the flank pieces viewed from the rear and equipped with the slides of the elevating system.
Figure 3:
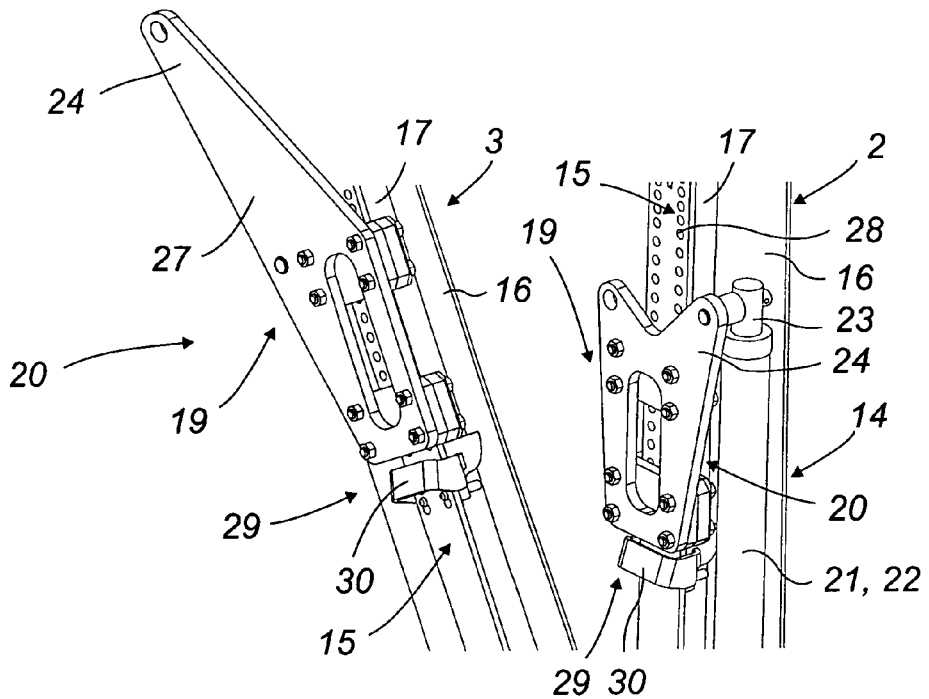
FIG. 3 is a perspective on a larger scale of two slides on supporting posts, one being upright and the other oblique.

Flank part 1 for the carriage of a vehicle-transporting unit that may or may not be motor driven is in the form a completed, ready to mount functional unit which, after assembly with the other components, constitutes a complete vehicle-transporting structure equipped with supporting platforms and other operational devices.

The flank part consists of upright posts such as post 2 and oblique posts such as post 3, simple or composite, joined together at their upper extremity by upper longitudinal pieces such as piece 4 and joined at their lower extremities to a longitudinal mechanical base 5. This base may be formed, for example, of a lower longitudinal element 6 on the central portion followed at the front by a lower longitudinal element at the front extremity 7 after a break 8 toward the top, a lower central longitudinal piece followed toward the rear by two successive arcs 9 and 10 surrounding the rear wheels.

The flank part is closed at each extremity first by a front upright piece 11 and second by a rear upright piece 12 extending downward into a median leg 13 located between the two arcs 9 and 10.

Certain posts known as supporting posts contain elevating means designed to support the individual movable supporting platforms for transporting vehicles. At least all the supporting posts, and preferably the others as well, have a straight, unclosed section so that no hollow portion is formed. They have an exterior surface and an interior surface 14 and 15, respectively, but not necessarily plane, belonging to two rectilinear bodies that are either distinct or joined by profiled parts that may consist of a plate or cover 16 and by a guide plate 17 possibly connected by a web 18. This possibility is materialized in figures 4 and 5 where web 18 is shown by the dotted lines. Simple or composite profiled parts or rectilinear elements having a generally straight I- or H-shaped section or even rectilinear parts composed of two separate rectilinear elements are suitable for this type of application. However, the invention is not limited to using rectilinear elements or profiled parts with plane or plate-like surfaces.

The surface that is turned toward the outside of the supporting carriage is called the external surface, and conversely, the surface turned toward the interior of the supporting carriage is called the internal surface.

In a particular embodiment, to achieve the visually masked effect, the external surface will preferably be wider than the internal surface. This arrangement is chosen not only for technical considerations, but also for the sake of appearance. The external surface of the rectilinear elements is wider than the internal surface, which allows the painted external surface to show so the unit presents a clean, esthetic appearance.

In actuality, since the external surface is wider than the internal surface, it provides an esthetic cover for the internal surface, visually blocking the internal surface and the devices and elements attached on the rear portion or internal portion of the profiled part or rectilinear element or immediately adjacent thereto when it is viewed directly from the front or from a slight angle. Note that it is from precisely this angle that the vehicle transporting structure is usually viewed. The long view from the rear is not interesting and the long view from the front is completely blocked by the cab.

This external surface will be painted according to the clients' specifications in their custom colors, while the internal surface, which has no visual interest, will be treated in accordance with technical requirements for protection from exterior corrosion.

The invention is not limited to using a predetermined straight section nor to a rectilinear element made of a single piece or mono-body; on the contrary, it encompasses any suitable shape that will give the desired effect of visually masking the front surface, referred to herein as the external surface.

Thus, not only may the rectilinear or profiled elements constituting the upright or oblique posts be monoblock type profiled elements formed by extrusion, die-stamping, or other techniques, but they also may be composite forms made from two or more separate or integral profiled elements joined longitudinally or in some other way.

This type of rectilinear element may consist of a flat profiled piece serving as a removable guide attached by its extremities, for example, to the structure of the flank part at a distance from a piece of metal used as a visual screen, that is, as a cover, but also which constitutes an element of the mechanical framework of the structure of the flank part.

H-shaped elements may also be used, formed by laterally juxtaposing two T-shaped profiled elements or using one T-shaped profiled element to which a plate has been joined, using the vertical branch of the T as the web, or composite elements consisting of two separate profiled elements or one easily removed element and its linear visual screen.

The following description relates simultaneously to an instance using one profiled element that is straight and I-shaped in which the transverse plates are of different widths and to an instance using one plate forming a profiled guide element and its exterior linear metal cover.

The profiled element of the supporting posts, used as an example, is formed of the plate or cover 16 on the external surface, which may be metal, facing toward the exterior side of the flank piece when it is mounted and of guide plate 17 on the internal surface facing toward the inside. Cover 16 and guide plate 17 are either separated and kept at a distance from the cover at removable attachment points, or else are linearly attached, either continuously or partially, by a web 18 which may also be flat.

Figure 4:
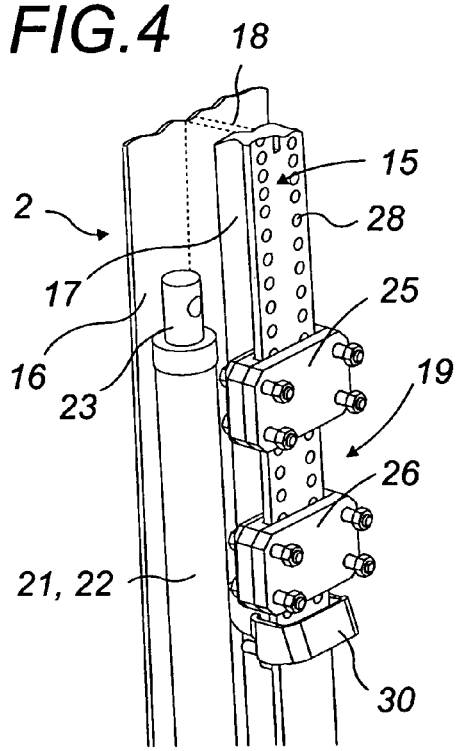
FIGS. 4 and 5 are perspective views, without and with the attaching platen, respectively, of one technical embodiment of the slide attached to the interior surface plate of a supporting post, with the webs shown by the dotted lines being optional.
Figure 5:
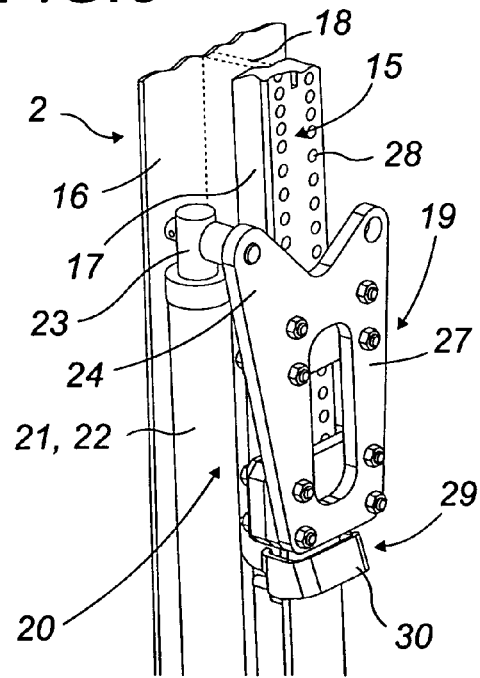

This alternative arrangement will be clearly understood from the drawing of web 18 shown by dotted lines in FIGS. 4 and 5.

Obviously the external surface 14 of cover 16 and the internal surface 15 of guide plate 17 are not necessarily flat and the shape of the rectilinear element of this structure is cited here only by way of non-limitative example.

To produce the desired visual blocking, plate or cover 16 on the external surface is wider than guide plate 17 on the internal surface.

Guide plate 17 on the internal side terminating at internal surface 15 of each supporting post serves as a guide for a slide 19 supporting an articulated connection with the adjacent supporting platform 32.

Each slide 19 is activated to move toward the top by a drive means for elevating device 20 and constrained toward the base by a support means that may or may not be integrated with the elevating device. The drive means for the elevating device or the support and elevating device might consist, for example, of an actuating cylinder 21 with its cylindrical body 22 attached to the internal surface of plate 16 on the external surface near or abutting web 18 so as to make it invisible when the flank part is viewed from the front or mounted in the space defined by plates 16 an 17.

Each shaft 23 of actuating cylinder 21 is articulated to a lateral extension 24 of a slide 19.

Slides 19 are two sliding mechanical blocks 25 and 26 that may be flange type blocks with the two component pieces of each mechanical block locking guide plate 17 in place as it slides along the internal surface of the element. The articulation to the supporting platform is joined to an attachment platen such as platen 27 joining two sliding mechanical blocks 25 and 26. Attachment platen 27 may have a lateral articulating extension 24 connecting it to actuating cylinder 22. Holes or openings such as openings 28 in guide plate 17 allow each slide block 19 to be mechanically immobilized in a predetermined support position according to whether the supporting platform is in the loaded or unloaded configuration.

Immobilization may be accomplished by using a pin or other separate immobilization device 29, for example, a catch that engages in openings 28 as shown in the drawings, which may or may not be connected to the body of slide 19. This immobilization device 29 comprises a portion that is transversely movable on the profiled section and equipped with a manipulating handle 30 for activating it to engage or disengage, for example, a finger blocking it in one of the corresponding openings 28. The immobilization device 29 shown is an immobilizing runner type device that is displaceable along the profiled guide element. It positions itself beneath slide 19 because it is the supporting immobilization position which holds the supporting platform down.

The supporting immobilization device or its equivalent may, of course, be directly integrated with the actuator, for example, in the same way as an antilocking device for a piston or the shaft of a cylinder or a hydraulic block.

Each flank piece 1 may extend at the front top portion into a longitudinal element such as element 31 that is maintained in abutment with the upper external frontal portion of front upright element 11. This longitudinal element and its counterpart form the support for a structure that overhangs the vehicle cab 33 to form a front upper platform 34 for supporting an additional car or part of a car to be transported.

Flank piece 1 described above constitutes a finished unit, separately manufactured, ready to be positioned during the final assembly phase. Thus, the largest possible number of components are attached to this flank piece before it is joined to the supporting vehicle or before it becomes part of the vehicle-transporting portion of the trailer. Each vehicle 35 comprises two flank pieces of the type described herein, a left piece and a right piece.

The said flank piece, along with its counterpart, forms a finished structure for the body of motorized or non-motorized vehicle 35 designed for transporting vehicles when used in duplicate, with one unit for each side.

It is joined to other sub-assemblies and eventually to the chassis using simple devices that make it independent of the particular nature of these sub-assemblies.

What is claimed is:

1. A flank piece (1), designed to be used in pairs, for an automobile transporter vehicle, the flank piece comprising:
   a plurality of rectilinear profiled sections, assembled with one another to form a side frame, comprising upper and lower longitudinal pieces permanently interconnected with one another by a plurality of supporting posts, and each of the plurality of supporting posts having an elevating device for adjusting a position of at least one support platform to be supported by the plurality of supporting posts;
   each elevating device having at least one slide coupled to a means for actuating the at least one slide, and a support means associated with the elevating device;
   a means far guiding the elevating devices comprising an internal surface profiled guide element, one of integral with or removable from the flank piece and along which the at least one slide of the elevating device is displaceable; and
   the means for guiding the elevating devices, the slides, and the means for actuating the slides are protected and visually screened by an external surface cover which forms an exterior mechanical structure of the flank piece.

2. The flank piece according to claim 1, wherein each means for guiding the elevating devices is attached to the mechanical structure of the flank piece, behind and at a distance from the cover at a level of structural flank piece upright or oblique elements.

3. The flank piece according to claim 1, wherein the flank piece (1) is attached to a base-chassis of a vehicle-transporting unit in a minimal number of locations.

4. The flank piece according to claim 1, wherein the flank piece (1) is attached to the base-chassis.

5. The flank piece according to claim 4, wherein the flank piece (1) is attached to the base-chassis at least a front end of each flank piece and at a rear end of each flank piece.

6. The flank piece according to claim 5, wherein the flank piece (1) is attached to transverse elements of a structure forming a vehicle-transporting unit.

7. The flank piece according to claim 1, wherein the elevating device (20) an elevating and support device.

8. The flank piece according to claim 1, wherein the means for actuating the slide is a cylinder (21).

9. The flank piece according to claim 1, wherein a forward most portion of each flank piece has a longitudinal element (31) which forms a support for an upper platform to be located above a cab of the vehicle.

10. The flank piece according to claim 1, wherein a support mechanism is integrated with the elevating device.

11. A flank piece (1) for a body of an automobile transporter, the flank piece (1) comprising:
   a plurality of rectilinear profiled sections assembled into a frame; supporting posts of the frame having elevating devices for manipulating support platforms of the automobile transporter;
   each elevating devices having at least one slide, a means for actuating the at least one slide and a support means that one of may or may not be integrated with the elevating device;
   a means for guiding the elevating devices, being an internal surface profiled guide element, one of integral with or removable from the flank piece and along which is displaced the at least one slide of the elevating device;
   the means for guiding the elevating devices, the slides, and the means for actuating the slides are protected and visually screened by an external surface cover which forms a mechanical structure of the flank piece; and
   the profiled element for guiding the slide (19) having openings (28) in linear succession.

12. The flank piece according to claim 11, wherein an immobilization device (29) is slidably attached along the profiled guide element for the slide (19) and cooperates with the openings (28) for immobilizing the slide (19) in a rest position, and each immobilization device has at least one immobilization element engaging in at least one of the openings (28) on the profiled guide element.

13. The flank piece according to claim 12, wherein the immobilization device (29) is integral with the actuating means (21).

14. A flank piece (1), designed to be used in pairs, for an automobile transporter vehicle, the flank piece comprising:
   a plurality of rectilinear profiled sections assembled with one another to form a side frame, comprising upper and lower longitudinal pieces permanently interconnected with one another by a plurality of supporting posts, and each of the plurality of supporting posts having an elevating device for adjusting a position of at least one support platform to be supported by the plurality of supporting posts;
   each elevating device having at least one slide coupled to a mechanism for actuating the at least one slide, and a support mechanism associated with the elevating device;
   a mechanism for guiding the elevating devices comprising an internal surface profiled guide element, one of integral with or removable from the flank piece and along which the at least one slide of the elevating device is displaceable; and
   the mechanism for guiding the elevating devices, the slides, and the mechanism for actuating the slides are protected and visually screened by an external surface cover which forms an exterior mechanical structure of the flank piece.

* * * * *